US005328748A

United States Patent [19]

Westfal

[11] Patent Number: 5,328,748

[45] Date of Patent: Jul. 12, 1994

[54] RECORDING MATERIAL FOR THE INK JET PROCESS

[75] Inventor: Horst Westfal, Belm, Fed. Rep. of Germany

[73] Assignees: Felix Schoeller, Jr.; Papierfabrik GmbH & Co. KG, Osnabruck, Fed. Rep. of Germany

[21] Appl. No.: 966,717

[22] Filed: Oct. 26, 1992

[30] Foreign Application Priority Data

Oct. 26, 1991 [DE] Fed. Rep. of Germany ....... 4135388

[51] Int. Cl.$^5$ ............................................... B32B 9/00

[52] U.S. Cl. ................................... 428/195; 428/207; 428/219; 428/474.4; 428/481; 428/500; 428/507; 428/515; 428/913

[58] Field of Search ............... 428/195, 913, 914, 335, 428/341, 500, 520, 411.1, 219, 207, 474.4, 480, 481, 507, 515

[56] References Cited

U.S. PATENT DOCUMENTS

| | | | |
|---|---|---|---|
| 4,680,235 | 7/1987 | Murakami et al. | 428/195 |
| 4,946,741 | 8/1990 | Aono et al. | 428/500 |
| 5,180,624 | 1/1993 | Kojima et al. | 428/195 |

FOREIGN PATENT DOCUMENTS

| | | |
|---|---|---|
| 2234823 | 7/1972 | Fed. Rep. of Germany . |
| 3016766 | 4/1980 | Fed. Rep. of Germany . |
| 3024205 | 6/1980 | Fed. Rep. of Germany . |
| 193185 | 11/1983 | Japan . |

*Primary Examiner*—Patrick J. Ryan
*Assistant Examiner*—William A. Krynski
*Attorney, Agent, or Firm*—Lockwood, Alex, Fitzgibbon & Cummings

[57] ABSTRACT

A recording material and coating therefor for an ink jet process wherein the coating forms an ink absorbing layer on a support material. The coating contains a hydrophilic binder and an oxidized polyethylene, and the oxidized polyethylene is present in the aqueous coating material which forms the ink absorbing layer as a cationic active emulsified oxidized polyethylene.

16 Claims, No Drawings

RECORDING MATERIAL FOR THE INK JET PROCESS

BACKGROUND AND DESCRIPTION OF INVENTION

This invention relates to a recording material for the ink jet process as well as to a coating material for the manufacture of an ink absorbing layer for the ink jet process.

In the ink jet process droplets of a recording fluid or ink are applied to a recording material according to various techniques. For example, in the Hertz process images are printed directly from electronic data with very high resolution by means of digital electronic control of fine ink droplets ejected from special nozzles.

With increasing improvement in the operation of ink jet printers, greater and greater demands are placed on recording materials. The image produced by the ink jet process should possess the following:

high resolution.
high color density.
sufficient color gradations.
good stability against wiping.

The following fundamental conditions must be fulfilled to attain these goals:

- the recording material must absorb ink as fast as possible.
- the ink droplets sprayed on the material must spread out as precisely as possible in a circular fashion and in an exactly delimited manner.
- the ink diffusion in the recording material must not be too high, so that the diameter of the ink spots will not increase more than absolutely necessary.
- the recording material must have a glossy surface in order to achieve a high visual reflection density and a high brilliance of colors.

These requirements are contradictory. For example, when stability against wiping occurs too fast, then an ink drop does not spread out at all or only slightly, thus jeopardizing the clarity of the developing image. Based on the requirements set for the recording material, means are being sought which would produce an image with the highest possible color density, consistent with the greatest possible resistance to wiping.

A recording material for multicolored ink jet printing comprises as a rule a support material and an ink absorbing layer applied thereupon.

A plastic foil, such as polyester resin or diacetate resin, or paper, among others can be employed as the support material.

The ink absorbing layers essentially comprise a pigment/binder mixture. In addition to increasing the brightness of the material, the pigments serve to retain the dyestuffs from the recording liquid onto the surface of the sheet. A high pigment concentration leads to greater porosity of the layer (DE-PS 30 24 205). In this manner, while good stability to wiping is attained, nonetheless at the same time pigments are drawn from the ink inside the recording material, thus making the color density of the image worse.

It is known that paper coated with gelatin (DE-PS 22 34 823) is used for an ink jet recording material. This coating is supposed to improve the stability to wiping and increase the resolution power. The principal disadvantage of this recording material is above all the fact that the images which are formed do not become sufficiently smudgeproof in the short time period desired, but only after more than 10 seconds. Another disadvantage is that the ink droplets do not spread out sufficiently or fast enough.

A claim is made in DE-OS 30 167 66 for a recording material which will assure high ink density and resolution of the printed image by applying a coating from a water soluble polymer on a paper support material which shows a defined water absorption capacity through internal sizing. This recording material has the disadvantage that the material must be additionally smoothed out in a separate working step, for example, using a glazing or super calender in order to achieve the desired ink density following application of the ink absorbing layer.

In the Japanese publication JP 58-193 185 two layers are applied on one support material. The upper layer consisting of a polyvinyl alcohol provides for a rapid ink absorption. The lower layer containing a synthetic silicic acid assures a high color density. The disadvantage of this system is that many working steps are required in the preparation of this recording material, namely the separate application of two layers and glazing with a calender.

A purpose of the present invention is to prepare a recording material for the ink jet process which does not exhibit the above mentioned disadvantages, and excels in high color density and high resolution, while at the same time the ink droplets quickly reach stability to wiping.

A purpose of this invention also is to prepare a coating material for the preparation of an ink absorbing layer for an ink jet recording material, which would make possible the preparation of the recording material without the disadvantages mentioned above.

These tasks are accomplished by applying on a polyolefin coated base paper, an ink absorbing layer which contains a hydrophilic binder and an oxidized polyethylene. The oxidized polyethylene is present in the aqueous coating material used for the ink absorbing layer as a cationic active emulsified oxidized polyethylene.

In a preferred form of the invention the hydrophilic binder is a protein containing binder, especially gelatin.

The oxidized polyethylene contained in the ink absorbing layer is present in the coating material used for this purpose in a cationic active emulsified form. Preferably the oxidized polyethylene is cationic-actively emulsified with compounds from the group of the fatty amines, fatty amino acetate and quaternary ammonium compounds among others. Especially, the oxidized polyethylene is an oxidized polyethylene cationic-actively emulsified with a stearyl fatty amino acetate.

The quantity of the cationic active emulsified oxidized polyethylene in the aqueous coating material amounts to between 0.1 and 5% by weight, and more preferably between 1 and 4% by weight.

The quantity of binder in the ink absorbing layer amounts to at least 50% by weight, and preferably 70 to 99% by weight referred to the dry layer.

In addition the ink absorbing layer can contain white pigments, coloring agents, hardening agents, dispersing agents, wetting agents, among other auxiliary agents.

The quantity of the ink absorbing layer amounts from 0.5 to 10 g/m$^2$, and preferably 2 to 7 g/m$^2$. The coating material for the ink absorbing layer can be applied onto the support material using all the customary coating and metering procedures, such as roller coating, engraving or nip processes, as well as air brushing or blade knife metering.

A coating material was prepared in the following manner with amounts as in Examples 1 and 2 to follow.

An aqueous gelatin solution with a gelatin content of 20% by weight was added, under agitation, to water heated to 45° C. Next, under agitation, a cationic—actively stabilized 32% aqueous emulsion of an oxidized polyethylene was added. The pH of the mixture was adjusted to a value of 8.5 by means of caustic soda. The addition of other components followed according to the sequence set forth in Examples 1 and 2.

A mixing time of approximately 3 to 5 minutes should be observed between individual additions. After adding the last components, the mixture was stirred 30 minutes longer at 45° C. and subsequently processed.

The polyolefin used for coating the base paper is preferably a low density polyethylene (LDPE) and/or high density polyethylene (HDPE). Other polyolefins, for example LLDPE or polypropylene, can also be used. The applied quantity of the polyolefin coating, which in addition can contain pigments and other additives, amounts to at least 5 $g/m^2$.

It was surprising that a combination of the hydrophilic binder with an oxidized polyethylene which in the aqueous coating material was present in the form of a cationically adjusted emulsion, gave such an outstanding printing quality because the hydrophilic binder alone or in combination with an oxidized polyethylene, whose emulsion was not cationic-actively stabilized, did not give correspondingly good results. The gloss of the recording material according to the invention does not require any additional secondary treatment, for example, by using a glazing calender.

It is also surprising, that the very good color density can be attained also without pigmentation of the ink absorbing layer.

Additionally the printed images exhibit good water resistance and resistance to abrasion.

The following examples will illustrate the invention in more detail.

EXAMPLE 1

The face side of the hereafter described polyethylene coated base paper was coated with the coating materials shown in the following table:

| COMPONENTS | COMPOSITION, wt % | | |
|---|---|---|---|
| | 1a | 1b | 1c |
| Gelatin (220 Bloom), 20% Water Solution | 61.0 | 61.0 | 56.4 |
| Oxidized polyethylene, 32% aqueous solution stabilized with stearyl fatty amino acetate (SUDRANOL 270, Suddeutsche Emulsions-Chemie GmbH) | 0.4 | 1.0 | 5.0 |
| Wetting agent (TRITON X 100), 10% In Water | 0.5 | 0.5 | 0.5 |
| Alcohol mixture (isopropyl alcohol:butanol:$H_2O$ 25:25:50) | 10.0 | 10.0 | 10.0 |
| Citric acid, 10% aqueous solution | 0.3 | 0.3 | 0.3 |
| Chromic alum, 10% aqueous solution | 1.5 | 1.5 | 1.4 |
| TAF*/Formaldehyde (1:0.05) 2% Sol. in isopropanol/butanol/$H_2O$ | 1.5 | 1.5 | 1.4 |
| Demineralized water | 24.8 | 24.2 | 25.0 |
| Coating weight, $g/m^2$ | 0.5 | 5.5 | 7 |

*TAF = 1,3,5 - triacryloyl-hexahydro-6-triazine

Other experimental conditions:

| COMPONENTS | COMPOSITION, wt % | | |
|---|---|---|---|
| | 1a | 1b | 1c |
| Machine speed | 100 m/min. | | |
| Drying temp. | 100° C. | | |
| Drying time | 1-2 minutes | | |

The base paper had a basis weight of 175 $g/m^2$ and the reverse side was coated with clear polyethylene in an amount of 15 $g/m^2$. The face side was coated with the following pigmented polyethylene mixture in the amount of 12 $g/m^2$:

37% LDPE with $d=0.434$ $g/cm^3$, MFI=3.0,
43% HDPE with $d=0.959$ $g/cm^3$, MFI=8.0, and
20% $TiO_2$—master batch with 50% $TiO_2$ by weight, MFI=15.

The face side showed the following colorimetric values:

L=98.0, a=−0.2, b=+1.6.

The recording material obtained was printed in a continuous ink jet printing process and subsequently analyzed. Results are summarized in Table 1.

EXAMPLE 2

The face side of a polyethylene coated base paper according to Example 1 was coated with the following coating materials shown in the following table:

| COMPONENTS | COMPOSITION, wt. % | |
|---|---|---|
| | 2a | 2b |
| Gelatin (220 Bloom), 20% Water solution | 51.0 | 46.0 |
| Oxidized polyethylene 32% in water stabilized with stearylamino acetate (SUDRANOL 270, Suddetsche Emulsions-Chemie GmbH) | 0.4 | 5.0 |
| Amphoteric silicic acid | 10.0 | 10.0 |
| Wetting agent (TRITON X 100), 10% aqueous solution | 0.5 | 0.5 |
| Alcohol mixture IPA/BU/$H_2O$ 25:25:50 | 10.0 | 10.0 |
| Citric acid, 10% aqueous solution | 0.3 | 0.3 |
| TAF/Formaldehyde (1:0.05), 2% in IPA/BU/$H_2O$ | 1.2 | 1.1 |
| Chromic alum, 10% in water | 1.2 | 1.1 |
| Demineralized water | 25.4 | 26.0 |
| Coating weight, $g/m^2$ | 7 | 7 |

The other conditions are the same as in Example 1. The test results are summarized in Table 1.

COMPARATIVE EXAMPLES

V1. Gelatin alone was used as a binder for the coating material. The cationic active stabilized oxidized polyethylene was not added. The other conditions were the same as in Example 1.

V2. A non-ionogenic stabilized oxidized polyethylene was used in addition to gelatin as coating material. The other conditions were the same as in Example 1.

The ink absorbing layers according to comparison V1 and V2 were applied from an aqueous medium in the following combinations:

| COMPONENTS | COMPOSITION, wt. % | |
|---|---|---|
| | V1 | V2 |
| Gelatin (220 Bloom), 20% in Water | 61.4 | 61.0 |
| Oxidized polyethylene, 32% in water | — | 0.4 |

-continued

| COMPONENTS | COMPOSITION, wt. % | |
|---|---|---|
| | V1 | V2 |
| non-ionogenic emulsifying system (SUDRANOL 340, Suddeutsche Emulsions Chemie GmbH | | |
| Wetting agent (TRITON X100), 10% in water | 0.5 | 0.5 |
| Alcohol mixture, IPA/BU/$H_2O$ 25:25:50 | 10.0 | 10.0 |
| Citric acid, 10% In Water | 0.3 | 0.3 |
| Chromic alum, 10% In Water | 1.5 | 1.5 |
| TAF/Formaldehyde (1:0.05), 2% IN IPA/BU/$H_2O$ | 1.5 | 1.5 |
| Demineralized water | 24.8 | 24.8 |
| Coating weight, g/$m^2$ | 7 | 7 |

The recording material obtained according to the comparison examples was printed upon by a continuous ink jet process and subsequently analyzed. Results are summarized in Table 2.

TESTING OF THE RECORDING MATERIAL PREPARED ACCORDING TO EXAMPLES 1-2 AND COMPARATIVE EXAMPLES V1-V2.

The recording material was printed upon with an Excelerator 4/1120 ink jet printer of Stork X-Cel, which operates according to the Hertz ink jet printing principle and using inks developed by Stork. The printed images were examined for color density, abrasion resistance, water resistance and gloss.

Density measurements were taken before and after a 24 hour exposure of the images with a xenon lamp. The instrument used for this purpose was an Original Reflection Densitometer SOS-45. Measurements were taken in the color gradations F1-F6 for the colors cyan, magenta, yellow and black. The F1 and F6 values are listed in the tables.

Stability against wiping was assessed according to the degree of the so-called "sinking" of the printing ink from surface of the material. The test was conducted separately for all four primary colors. The designation "+" means that all colors are to the same degree immediately absorbed into the sheet surface, namely penetrate inside the layer. The designation "o" means that three primary colors penetrate immediately from the sheet surface inside the layer, while the fourth primary color penetrates only after several seconds. A poor stability of the material against wiping is designated with "−" namely only weak or no penetration is observed for almost all colors.

To test for water resistance and abrasion resistance, the recording material sample was heated in water at 5° C. steps and rubbed. The temperature at which the white background of the recording material showed through was taken as the measure of hygrostability and abrasion resistance.

The gloss of the recording material was measured with a three angled gloss meter according to Dr. Lange at an angle of 60°.

The results summarized in Tables 1 and 2 show that when using the recording material according to the invention, printed images can be obtained which possess high color density values and at the same time a rapid stability to wiping. Images printed on recording material prepared according to the invention also have better water and abrasion resistance values than the comparison materials.

TABLE 1

Properties of Printed Recording Material Prepared According to Examples 1-2.

| EXAMPLE | F | COLOR DENSITY cyan a | cyan b | magenta a | magenta b | yellow a | yellow b | black a | black b | WATER AND ABRASION RESISTANCE, °C. | STABILITY TO WIPING | GLOSS, % |
|---|---|---|---|---|---|---|---|---|---|---|---|---|
| 1a | F1 | 1.94 | 1.81 | 1.75 | 1.49 | 1.97 | 0.74 | 2.05 | 1.81 | 55 | o | 90.6 |
| | F6 | 0.53 | — | 0.39 | — | 0.53 | — | 0.53 | — | | | |
| 1b | F1 | 1.94 | 1.80 | 1.75 | 1.52 | 1.97 | 1.36 | 2.03 | 1.80 | 71 | + | 92.1 |
| | F6 | 0.54 | — | 0.40 | — | 0.53 | — | 0.53 | — | | | |
| 1c | F1 | 1.91 | 1.76 | 1.76 | 1.51 | 1.96 | 1.53 | 2.02 | 1.77 | 78 | + | 93.3 |
| | F6 | 0.49 | — | 0.40 | — | 0.53 | — | 0.55 | — | | | |
| 2a | F1 | 1.85 | 1.70 | 1.79 | 1.37 | 1.99 | 1.14 | 2.06 | 1.76 | 70 | + | 89.4 |
| | F6 | 0.40 | — | 0.40 | — | 0.52 | — | 0.51 | — | | | |
| 2b | F1 | 1.82 | 1.70 | 1.77 | 1.52 | 1.95 | 1.58 | 2.02 | 1.76 | 65 | + | 94.8 |
| | F6 | 0.42 | — | 0.41 | — | 0.51 | — | 0.54 | — | | | |

a - before exposure with xenon lamp
b - after 24 hr. exposure with xenon-lamp
+ = good
o = average
− = poor

TABLE 2

Properties of the Printed Recording Material Prepared According to Comparison Examples V1-V2.

| EXAMPLE | F | COLOR DENSITY cyan a | cyan b | magenta a | magenta b | yellow a | yellow b | black a | black b | WATER AND ABRASION RESISTANCE, °C. | STABILITY TO WIPING | GLOSS, % |
|---|---|---|---|---|---|---|---|---|---|---|---|---|
| V1 | F1 | 1.85 | 1.49 | 1.59 | 1.25 | 1.49 | 1.29 | 1.51 | 1.41 | 21.4 | o | 34 |
| | F6 | 0.07 | — | 0.08 | — | 0.05 | — | 0.10 | — | | | |
| V2 | F1 | 1.72 | 1.43 | 1.36 | 1.24 | 1.55 | 1.49 | 1.49 | 1.41 | 19.0 | — | 36 |
| | F6 | 0.12 | — | 0.10 | — | 0.12 | — | 0.13 | — | | | |

a - before exposure with xenon lamp
b - after 24 hr exposure with xenon lamp
+ = good
o = average
− = poor

I claim:

1. A recording material for an ink jet process comprising a support material with a dried ink absorbing layer applied as an aqueous coating thereon, said ink absorbing layer containing a hydrophilic binder and an oxidized polyethylene, said oxidized polyethylene being present in the ink absorbing layer aqueous coating as a cationic active emulsified oxidized polyethylene.

2. The recording material of claim 1, wherein the support material is a polyolefin coated base paper or a plastic foil.

3. The recording material of claim 1, wherein the hydrophilic binder is a protein containing binder.

4. The recording material of claim 3, wherein the hydrophilic binder is a gelatin.

5. The recording material of claim 1, wherein the oxidized polyethylene is a cationic active oxidized polyethylene emulsified with compounds from the group consisting of fatty amines, fatty amino acetates and quaternary ammonium compounds.

6. The recording material of claim 5, wherein the oxidized polyethylene is a cationic active oxidized polyethylene emulsified with stearyl fatty amino acetate.

7. The recording material of claim 4, wherein the oxidized polyethylene is a cationic active oxidized polyethylene emulsified with compounds from the group consisting of fatty amines, fatty amino acetates and quaternary ammonium compounds.

8. The recording material of claim 7, wherein the oxidized polyethylene is a cationic active oxidized polyethylene emulsified with stearyl fatty amino acetate.

9. The recording material of claim 1, wherein the quantity of the cationic active, emulsified, oxidized polyethylene present in the coating is between about 0.1 to 5 wt %.

10. The recording material of claim 5, wherein the quantity of the cationic active, emulsified, oxidized polyethylene present in the coating is between about 0.1 to 5 wt %.

11. The recording material of claim 1, wherein the quantity of the binder in the ink absorbing layer is at least 50% by weight.

12. The recording material of claim 4, wherein the quantity of the binder in the ink absorbing layer is at least 50% by weight.

13. The recording material of claim 1, wherein the ink absorbing layer also contains an ingredient from the group consisting of pigments, coloring agents, hardening agents, dispersing agents, wetting agents and other auxiliary agents.

14. The recording material claim 1, wherein the support material is a base paper coated with a polyolefin in an mount of at least 5 $g/m^2$.

15. The recording material of claim 1, wherein the amount of the polyolefin coating is about 10 to 35 $g/m^2$.

16. The recording material of claim 2, wherein the polyolefin is polyethylene.

* * * * *

UNITED STATES PATENT AND TRADEMARK OFFICE
CERTIFICATE OF CORRECTION

PATENT NO. : 5,328,748

DATED : July 12, 1994

INVENTOR(S) : Horst Westfal

It is certified that error appears in the above-indentified patent and that said Letters Patent is hereby corrected as shown below:

Col. 3, line 66, "1,3,5-triacryloyl-hexahydro-6-triazine" should read --1,3,5-triacryloyl-hexahydro-s-triazine--.
Col. 8, line 25, "mount" should read --amount--.

Signed and Sealed this

Twenty-first Day of March, 1995

Attest:

BRUCE LEHMAN

*Attesting Officer* *Commissioner of Patents and Trademarks*